United States Patent Office 3,172,903
Patented Mar. 9, 1965

3,172,903
1,3,2 - OXAZAPHOSPHOLIDINE AND 1,3,2 - OXAZA-PHOSPHORINANE PHOSPHORUS ESTER COMPOUNDS
Theodor Reetz, Webster Groves, and John Francis Powers, Creve Coeur, Mo., assignors to Monsanto Company, a corporation of Delaware
No Drawing. Filed May 20, 1963, Ser. No. 281,746
11 Claims. (Cl. 260—461)

This invention relates to a novel class of organic phosphorus materials. More particularly, this invention is concerned with compounds which contain at least one oxazapholidine or oxazaphosphorinane group, and with the manner in which such compounds are prepared.

The novel compounds of this invention have the formula

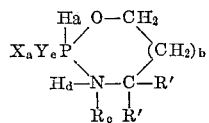

wherein:

X represents 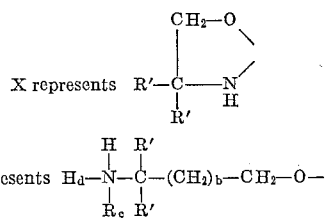

Y represents $H_d-\overset{H}{\underset{R_c}{N}}-\overset{R'}{\underset{R'}{C}}-(CH_2)_b-CH_2-O-$ each R' is selected from the group consisting of hydrogen and alkyl of 1 to 4 carbon atoms;
R is selected from the group consisting of alkyl of 1 to 8 carbon atoms, allyl, benzyl, cyclohexyl, phenyl and alklphenyl of 7 to 10 carbon atoms;
$a$ and $e$ are unlike integers from zero to 1;
$c$ and $d$ are unlike integers from zero to 1;
$b$ is an integer from zero to 1; and
$a$ is zero when the sum of $b+c$ is at least 1.

The alkyl radicals represented by R' include methyl, ethyl, isopropyl, n-butyl, t-butyl and the like. These alkyl radicals are also represented by R, which further includes higher alkyls such as pentyl, neopentyl, n-hexyl, 2-methylbutyl, isoheptyl, n-octyl, 2-ethylhexyl and the like. The alkylphenyl radicals represented by R include tolyl, the isomeric xylyls, ethylphenyl, cumyl and the like.

It has been found that the compounds of this invention can be prepared by reacting an appropriate aminoalcohol with phosphorus trichloride or with a hexaalkyl phosphorus triamide wherein the alkyl groups are methyl or ethyl. When the alcohol reactant is a primary β-aminoethanol, the phosphorus compound obtained is of the spirane type. The phosphorus atom is pentavalent, and the equation can be shown as follows:

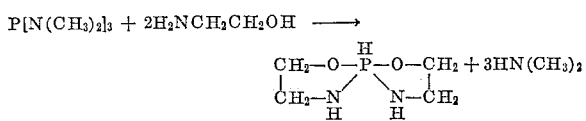

A spirane-type compound is similarly obtained if the β-carbon atom of the ethanol is alkyl substituted. In Formula I, the spirane compounds represent the case where $a$ and $d$ are equal to 1, and $b$, $c$ and $e$ are equal to zero.

However, when the alcohol reactant is a primary or secondary 3-aminopropanol or a secondary β-aminoalcohol, the phosphorus compound obtained has only a single cyclic group. The phosphorus atom in such instances is trivalent, and the equations can be shown as follows:

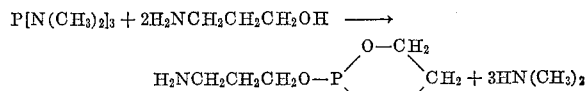

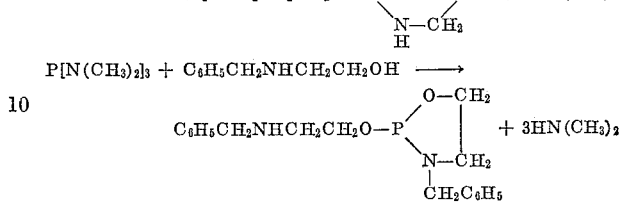

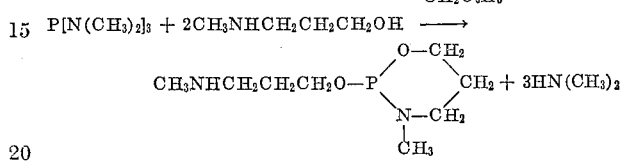

The first of these latter equations represents the case where, in Formula I, $a$ and $c$ are equal to zero, and $b$, $d$ and $e$ are equal to 1; the second equation represents the case where $a$, $b$ and $d$ are equal to zero, and $c$ and $e$ are equal to 1; and the third equation represents the case where $a$ and $d$ are equal to zero and $b$, $c$ and $e$ are equal to 1. Here again, the carbon atom of the aminoalcohol attached to the nitrogen atom can be alkyl substituted. It will be understood that the term "secondary," as used herein, refers to the amine group.

When a hexaalkyl phosphorus triamide is employed, the reactions of this invention proceed quite readily in the absence of a solvent. If desired, an inert solvent can be employed. Illustrative of solvents which are used include benzene, toluene, dioxane, and tetrahydrofuran, and aliphatic hydrocarbons such as hexane, heptane, octane and the like. The reaction temperature is generally in the range of from about 30° C. to about 130° C., although it is preferred to employ a temperature of from about 70° C. to about 100° C. When phosphorus trichloride is employed, the reaction temperature is about 30° C. or less, preferably in the range of 30° C. to —30° C., and the use of an inert solvent is preferred.

It will be noted that, when the starting phosphorus compound is phosphorus trichloride, hydrogen chloride will be formed as a by-product. In such cases, it is preferred to add a tertiary amine as a hydrogen chloride acceptor. The use of such acceptors as trimethylamine, triethylamine, pyridine and the like is well known in the art. If desired, an excess amount of the aminoalcohol can be employed as an acceptor for the hydrogen chloride. In such a case, the aminoalcohol is charged to the reactor, and the phosphorus trichloride is added thereto.

The invention will be more fully understood by reference to the following exemplary preparations of specific representative compounds. These examples, however, are presented for the purpose of illustration only, and are not to be construed as limiting the scope of the present invention in any way.

Example 1

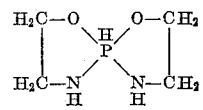

1,9-dioxa-4,6-diaza-5-Phosphaspiro-[4,4]nonane

A suitable reaction vessel is charged with 51.0 grams (0.83 mol) of aminoethanol and heated to about 85° C. 32.6 grams (0.2 mol) of hexamethyl phosphorous triamide is added dropwise, and the reaction mixture is gradually heated to 100° C. and then to about 130° C. for a short time. The dimethylamine by-product is trapped and removed. The reacted material crystallizes at room temperature, after which it is distilled at reduced pressure. A first fraction, which is essentially the excess of aminoethanol, is obtained at 73–78° C. at 15 mm. Hg. The residue is sublimed at reduced pressure to yield 22.1 grams of 1,9-dioxa-4,6-diaza-5-phosphaspiro-[4,4]nonane as a crystalline material. This product is recrystallized twice from hexane. Analysis shows 20.81% phosphorus and 18.38% nitrogen, as against calculated values of 20.64% and 18.66%, respectively, for $C_4H_{11}N_2O_2P$, M.P. 110–111° C.

When 49.5 grams of hexaethyl phosphorous triamide is used in place of the hexamethyl compound, diethylamine is the by-product, and the same end product is obtained.

*Example 2*

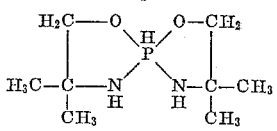

3,3,7,7-tetramethyl-1,9-dioxa-4,6-diaza-5-phosphaspiro-[4,4]nonane

A suitable reaction vessel is charged with 8.2 grams (0.05 mol) of hexamethyl phosphorous triamide and 7.5 grams (0.1 mol) of 2-methyl-2-aminopropanol. The reaction mixture is gradually heated to about 85° C. Most of the dimethylamine by-product escapes at about 70–75° C. Said mixture is then cooled to room temperature, and the reaction mass crystallizes. The crystalline product is dissolved in about 10–15 ml. of hot toluene, and 40 ml. of hexane is added. The hot solution is filtered, and the filtrate is chilled overnight in a refrigerator. A crystalline precipitate is obtained, and it is filtered, washed with cold hexane, and dried. There is obtained 5.6 grams of 3,3,7,7-tetramethyl-1,9-dioxa-4,6-diaza-5-phosphaspiro-[4,4]-nonane, M.P. 101–102° C. Analysis shows 47.0% carbon and 13.36% nitrogen, as against calculated values of 46.7% and 13.6%, respectively, for $C_8H_{19}N_2O_2P$.

When 14.5 grams of 2-isopropyl-3-methyl-2-antinobutanol is substituted for the 2-methyl-2-aminopropanol, the product obtained is 3,3,7,7-tetraisopropyl-1,9-dioxa-4,6-diaza-5-phosphaspiro-[4,4]nonane.

*Example 3*

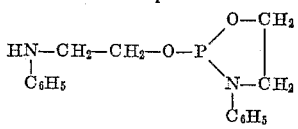

2-anilinoethoxy-3-phenyl-1,3,2-oxazaphospholidine

A suitable reaction vessel is charged with 16.3 grams (0.1 mol) of hexamethyl phosphorous triamide and 24.6 grams (0.2 mol) of 2-anilinoethanol. The mixture is heated slowly to about 70° C., and the dimethylamine by-product is trapped and removed. Said mixture is then further heated to about 78° C. at 60 mm. Hg, after which the reacted mass is permitted to cool. There is obtained 26.3 grams of 2-anilinoethoxy-3-phenyl-1,3,2-oxazaphospholidine as an oily product. Said product is treated with ether and hexane to yield the crystalline material, M.P. 52° C.

When 20.2 grams of allylaminoethanol is employed in place of the anilinoethanol, the product obtained is 2-allylaminoethoxy-3-allyl-1,3,2-oxazaphospholidine.

*Example 4*

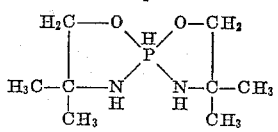

3,3,7,7-tetramethyl-1,9-dioxa-4,6-diaza-5-phosphaspiro-[4,4]nonane

A suitable reaction vessel is charged with 30.3 grams (0.3 mol) of triethylamine and 13.7 grams (0.1 mol) of phosphorous trichloride dissolved in 200 ml. of chloroform. There is then added 17.8 grams (.24 mol) of 2-methyl-2-aminopropanol dissolved in 100 ml. of chloroform. The addition is carried out gradually, with stirring, and at a temperature of about $-5°$ C. The mixture is then stirred at room temperature for about 3 hours, after which it is evaporated under vacuum, leaving a yellow residue. Said residue is added to 300 ml. of ether and stirred. The triethylamine hydrochloride precipitate is filtered off.

Hexane is added to the filtrate, and a yellow gummy precipitate which forms is discarded. Evaporation is then continued to yield 3,3,7,7-tetramethyl-1,9-dioxa-4,6-diaza-5-phosphaspiro-[4,4]nonane. The nature of the product is verified by means of nuclear magnetic resonance.

*Example 5*

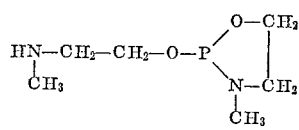

2-methylaminoethoxy-3-methyl-1,3,2-oxazaphospholidine

A suitable reaction vessel is charged with 16.3 grams (0.1 mol) of hexamethyl phosphorous triamide and 15.0 grams (0.2 mol) of methylaminoethanol. The mixture is heated slowly to about 70° C., and the dimethylamine by-product is trapped and removed. Said mixture is then further heated to a distillation temperature of about 120° C. at 1 mm. Hg, after which it is redistilled at about 90° C. at 0.05–0.1 mm. Hg. There is obtained 12.5 grams of 2-methylaminoethoxy-3-methyl-1,3,2-oxazaphospholidine. Analysis shows 15.48% nitrogen, as against a calculated value of 15.73% for $C_6H_{15}N_2O_2P$.

When 20.6 grams of 2-methyl-2-methylaminopropanol is employed in place of the methylaminoethanol, the product obtained is 2-(2-methyl-2-methylaminopropoxy)-3,4,4-trimethyl-1,3,2-oxazaphospholidine.

*Example 6*

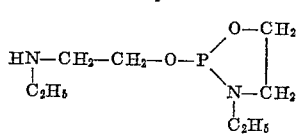

2-ethylaminoethoxy-3-ethyl-1,3,2-oxazaphospholidine

A suitable reaction vessel is charged with 24.45 grams (0.15 mol) of hexamethyl phosphorous triamide and 26.74 grams (0.3 mol) of ethylaminoethanol. The mixture is heated to about 85° C. over a period of 90 minutes, and the dimethylamine by-product is trapped and removed. Said mixture is then further heated to a distillation temperature of about 120° C. at 0.2 mm. Hg, after which it is redistilled at about 110° C. at 0.1 mm. Hg. There is obtained 23.2 grams of 2-ethylaminoethoxy-3-ethyl-1,3,2-oxazaphospholidine. Analysis shows 13.42% of nitrogen, as against a calculated value of 13.6% for $C_8H_{19}N_2O_2P$.

When 51.4 grams of N-cyclohexyl-2-aminobutanol is employed in place of the ethylaminoethanol, the product obtained is 2-(2-cyclohexylaminobutoxy)-3-cyclohexyl-4-ethyl-1,3,2-oxazaphospholidine.

*Example 7*

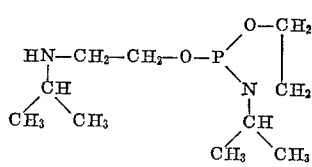

2-isopropylaminoethoxy-3-isopropyl-1,3,2-oxazaphospholidine

A suitable reaction vessel is charged with 16.3 grams (0.1 mol) of hexamethyl phosphorous triamide and 20.6 grams (0.2 mol) of 2-isopropylaminoethanol. The mixture is heated to about 100° C. over a period of 45 minutes, and the dimethylamine by-product is trapped and removed. The mixture is then further heated to a distillation temeprature of about 90° C. at 1 mm. Hg. The distillate obtained is 8.2 grams of 2-isopropylaminoethoxy - 3 - isopropyl-1,3,2-oxazaphospholidine. Analysis shows 12.84% of nitrogen, as against a calculated value of 12.0% for $C_{10}N_{23}N_2O_2P$.

*Example 8*

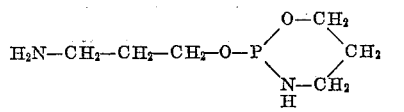

2-(3-aminopropoxy)-1,3,2-oxazaphosphorinane

A suitable reaction vessel is charged with 16.3 grams (0.1 mol) of hexamethyl phosphorous triamide and 15.0 grams (0.2 mol) of 3-amino-1-propanol. The mixture is heated to a temperature of about 113° C. over a period of about 2 hours, and the dimethylamine by-product is trapped and removed. The mixture is then further heated to a distillation temperature of about 102° C. at 0.5–1.0 mm. Hg. There is obtained 15.2 grams of 2-(3-aminopropoxy)-1,3,2-oxazaphosphorinane. Analysis shows 15.46% of nitrogen, as against a calculated value of 15.7% for $C_6H_{15}N_2O_2P$.

When 25.9 grams of 3-p-ethylanilino-1-propanol is employed in place of the 3-amino-1-propanol, the product obtained is 2-(3-p-ethylanilinopropoxy)-3-p-ethylphenyl-1,3,2-oxazaphosphorinane.

The compounds of the present invention have been found to be useful in the control of fungal organisms. They are particularly effective in the control of soil fungi such as *Pythium iltimum* and *Rhizoctonia solani*.

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A compound selected from the group consisting of compounds of the formulae,

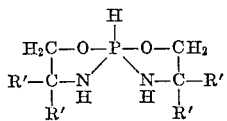

and

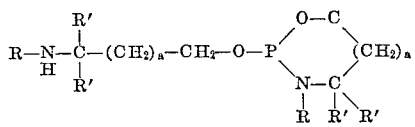

wherein each R' is selected from the group consisting of hydrogen and alkyl of 1 to 4 carbon atoms; each R is selected from the group consisting of hydrogen, alkyl of 1 to 8 carbon atoms, allyl, cyclohexyl, benzyl, phenyl and alkylphenyl of 7 to 10 carbon atoms; and *a* is an integer from zero to one; provided that R is other than hydrogen when *a* equals zero.

2. A compound of the formula,

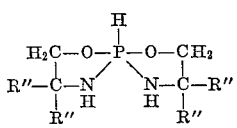

wherein each R'' is alkyl of 1 to 4 carbon atoms.

3. A compound of the formula,

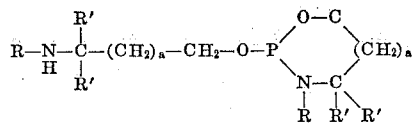

wherein each R' is selected from the gorup consisting of hydrogen and alkyl of 1 to 4 carbon atoms; each R is selected from the group consisting of hydrogen, alkyl of 1 to 8 carbon atoms, allyl, cyclohexyl, benzyl, phenyl and alkylphenyl of 7 to 10 carbon atoms; and *a* is an integer from zero to one; provided that R is other than hydrogen when *a* equals zero.

4. 1,9-dioxa-4,6-diaza-5-phosphaspiro-[4,4]nonane.

5. 3,3,7,7 - tetramethyl - 1,9 - dioxa - 4,6 - diaza - 5-phosphaspiro-[4,4]nonane.

6. 2 - anilinoethoxy - 3 - phenyl - 1,3,2 - oxazaphospholidine.

7. 2 - methylaminoethoxy - 3 - methyl - 1,3,2 - oxazaphospholidine.

8. 2-(3-aminopropoxy)-1,3,2-oxazaphosphorinane.

9. A method of preparing a compound selected from the group consisting of compounds of the formulae,

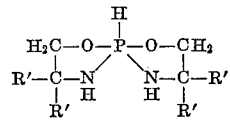

and

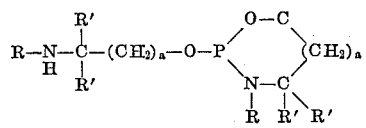

wherein each R' is selected from the group consisting of hydrogen and alkyl of 1 to 4 carbon atoms; each R is selected from the group consisting of hydrogen, alkyl of 1 to 8 carbon atoms, allyl, cyclohexyl, benzyl, phenyl and alkylphenyl of 7 to 10 carbon atoms; and *a* is an integer from zero to one; provided that R is other than hydrogen when *a* equals zero; which comprises contacting an aminoalcohol selected from the group consisting of alcohols of the formulae,

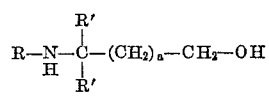

and

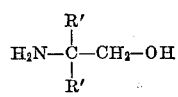

wherein R, R' and *a* have the same meaning as above, with a compound of the formula, $PZ_3$, wherein Z is selected from the group consisting of dimethylamino, diethylamino and chlorine.

10. A method of preparing a compound of the formula,

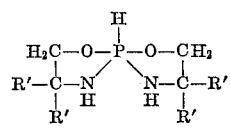

wherein each R' is selected from the group consisting of hydrogen and alkyl of 1 to 4 carbon atoms, which comprises contacting a primary β-aminoethanol of the formula,

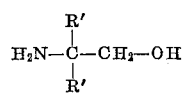

wherein R' has the same meaning as above, with a compound of the formula, PZ$_3$, wherein Z is selected from the group consisting of dimethylamino, diethylamino and chlorine.

11. A method of preparing a compound of the formula

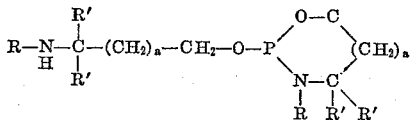

wherein each R' is selected from the group consisting of hydrogen and alkyl of 1 to 4 carbon atoms; each R is selected from the group consisting of hydrogen, alkyl of 1 to 8 carbon atoms, allyl, cyclohexyl, benzyl, phenyl and alkylphenyl of 7 to 10 carbon atoms; and $a$ is an integer from zero to one; provided that R is other than hydrogen when $a$ equals zero; which comprises contacting an aminoalcohol of the formula.

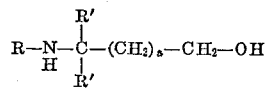

wherein R, R' and $a$ have the same meaning as above, with a compound of the formula, PZ$_3$, wherein Z is selected from the group consisting of dimethylamino, diethylamino and chlorine.

References Cited in the file of this patent
UNITED STATES PATENTS
2,865,948    Fusco _____ Dec. 23, 1958